(12) United States Patent
Johnson et al.

(10) Patent No.: US 12,407,650 B2
(45) Date of Patent: *Sep. 2, 2025

(54) SMART NETWORK SWITCHING SYSTEMS AND RELATED METHODS

(71) Applicant: Battelle Energy Alliance, LLC, Idaho Falls, ID (US)

(72) Inventors: Briam Johnson, Idaho Falls, ID (US); Michael V. McCarty, Idaho Falls, ID (US); Rishi R. Chatterjee, Ammon, ID (US); Kristopher Watts, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/735,045

(22) Filed: Jun. 5, 2024

(65) Prior Publication Data

US 2024/0323164 A1 Sep. 26, 2024

Related U.S. Application Data

(63) Continuation of application No. 17/253,724, filed as application No. PCT/US2019/036787 on Jun. 12, 2019, now Pat. No. 12,028,318.

(Continued)

(51) Int. Cl.
*H04L 9/40* (2022.01)
*H04L 43/18* (2022.01)
*H04L 67/75* (2022.01)

(52) U.S. Cl.
CPC .......... *H04L 63/0236* (2013.01); *H04L 43/18* (2013.01); *H04L 63/104* (2013.01);
(Continued)

(58) Field of Classification Search
CPC . H04L 63/1408; H04L 63/0236; H04L 63/18; H04L 63/104; H04L 43/18; H04L 67/75
See application file for complete search history.

(56) References Cited

U.S. PATENT DOCUMENTS 9,038,151 B1 5/2015 Chua et al.
9,071,529 B2 * 6/2015 Garg ........................ H04L 47/12
(Continued)

OTHER PUBLICATIONS

International Search Report for International Application No. PCT/US19/36787, dated Aug. 28, 2019, 3 pages.
(Continued)

*Primary Examiner* — Nam T Tran
(74) *Attorney, Agent, or Firm* — TraskBritt

(57) ABSTRACT

A method of monitoring and controlling network traffic within an industrial control system including receiving one or more data packets at a smart network switching system operating software-defined networking, analyzing the one or more data packets at a protocol level within a control plane of the software-defined networking, based on the analysis, determining whether the one or more data packets are authorized data packets, and forwarding a data packet of the one or more data packets to a destination device within a data plane of the software-defined networking upon determining that the data packet is an authorized data packet. The method further includes providing information related to the analysis of the one or more data packets to an out-of-band monitoring and control system for display to a user, and receiving a response communication from the out-of-band monitoring and control system indicating whether the one or more data packets are authorized data packets.

20 Claims, 6 Drawing Sheets

Related U.S. Application Data

(60) Provisional application No. 62/686,300, filed on Jun. 18, 2018.

(52) U.S. Cl.
CPC ......... *H04L 63/1408* (2013.01); *H04L 63/18* (2013.01); *H04L 67/75* (2022.05)

(56) References Cited

U.S. PATENT DOCUMENTS

| | | |
|---|---|---|
| 9,210,177 B1 | 12/2015 | Hughes |
| 10,693,891 B2 | 6/2020 | Kemp et al. |
| 11,489,554 B2 | 11/2022 | Gordon et al. |
| 2008/0320582 A1 | 12/2008 | Chen et al. |
| 2010/0306533 A1 | 12/2010 | Phatak |
| 2012/0314868 A1 | 12/2012 | Bernheim et al. |
| 2015/0334090 A1 | 11/2015 | Ling et al. |
| 2017/0093794 A1 | 3/2017 | Natu et al. |
| 2017/0093887 A1 | 3/2017 | Schwartz et al. |
| 2017/0339109 A1 | 11/2017 | Zeng et al. |
| 2018/0083876 A1 | 3/2018 | Sharma et al. |
| 2018/0145949 A1 | 5/2018 | Ling et al. |
| 2018/0183756 A1* | 6/2018 | Bangalore Krishnamurthy ........ H04L 63/1416 |
| 2018/0241700 A1 | 8/2018 | Sazawa et al. |
| 2019/0173778 A1 | 6/2019 | K et al. |
| 2019/0250899 A1 | 8/2019 | Riedl et al. |
| 2019/0335002 A1 | 10/2019 | Bogineni et al. |
| 2021/0029029 A1 | 1/2021 | Mehmedagic et al. |
| 2021/0144091 A1 | 5/2021 | C H et al. |

OTHER PUBLICATIONS

International Written Opinion for International Application No. PCT/US19/36787, dated Aug. 28, 2019, 6 pages.

\* cited by examiner

SMART NETWORK SWITCHING SYSTEMS AND RELATED METHODS

CROSS-REFERENCE TO RELATED APPLICATIONS

This application is a continuation of U.S. patent application Ser. No. 17/253,724, filed Dec. 18, 2020, now U.S. Pat. No. 12,028,318, issued Jul. 2, 2024, which is a national phase entry under 35 U.S.C. § 371 of International Patent Application PCT/US2019/036787, filed Jun. 12, 2019, designating the United States of America and published as International Patent Publication WO 2019/245824 A1 on Dec. 26, 2019, which claims the benefit under Article 8 of the Patent Cooperation Treaty to U.S. Patent Application Ser. No. 62/686,300, filed Jun. 18, 2018.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

TECHNICAL FIELD

This disclosure relates generally to traffic control systems for industrial control system networks. In particular, this disclosure relates to a smart network switching system utilizing software-defined networking to monitor and control traffic through the smart network switching system. The disclosure further relates to methods of using traffic control systems.

BACKGROUND

With the threat of cyber-attack on critical infrastructure widely acknowledged and growing, there are many entities focused on developing methods of protecting industrial control systems from cyber-attacks. Many conventional technologies are directed to monitoring traffic only. Additional conventional technologies apply industrial control system-focused signatures and/or algorithms to detect and filter intrusions. Yet further conventional technologies, including internet protocol based whitelisting and encryption. Often the conventional technologies assume that endpoints are secure, which, unfortunately, is a flawed assumption. Some technologies include "bump-in-the wire" devices that are designed to protect one piece of equipment. Still others are designed to monitor traffic based on connections to span ports on existing switches. One problem with the aforementioned technologies is that the technologies are difficult scale, which makes it difficult to apply the technologies to relatively larger systems and to the technologies manage remotely.

BRIEF DESCRIPTION OF THE DRAWINGS

For a detailed understanding of the present disclosure, reference should be made to the following detailed description, taken in conjunction with the accompanying drawings, in which like elements have generally been designated with like numerals, and wherein.

DETAILED DESCRIPTION

Figure 1:
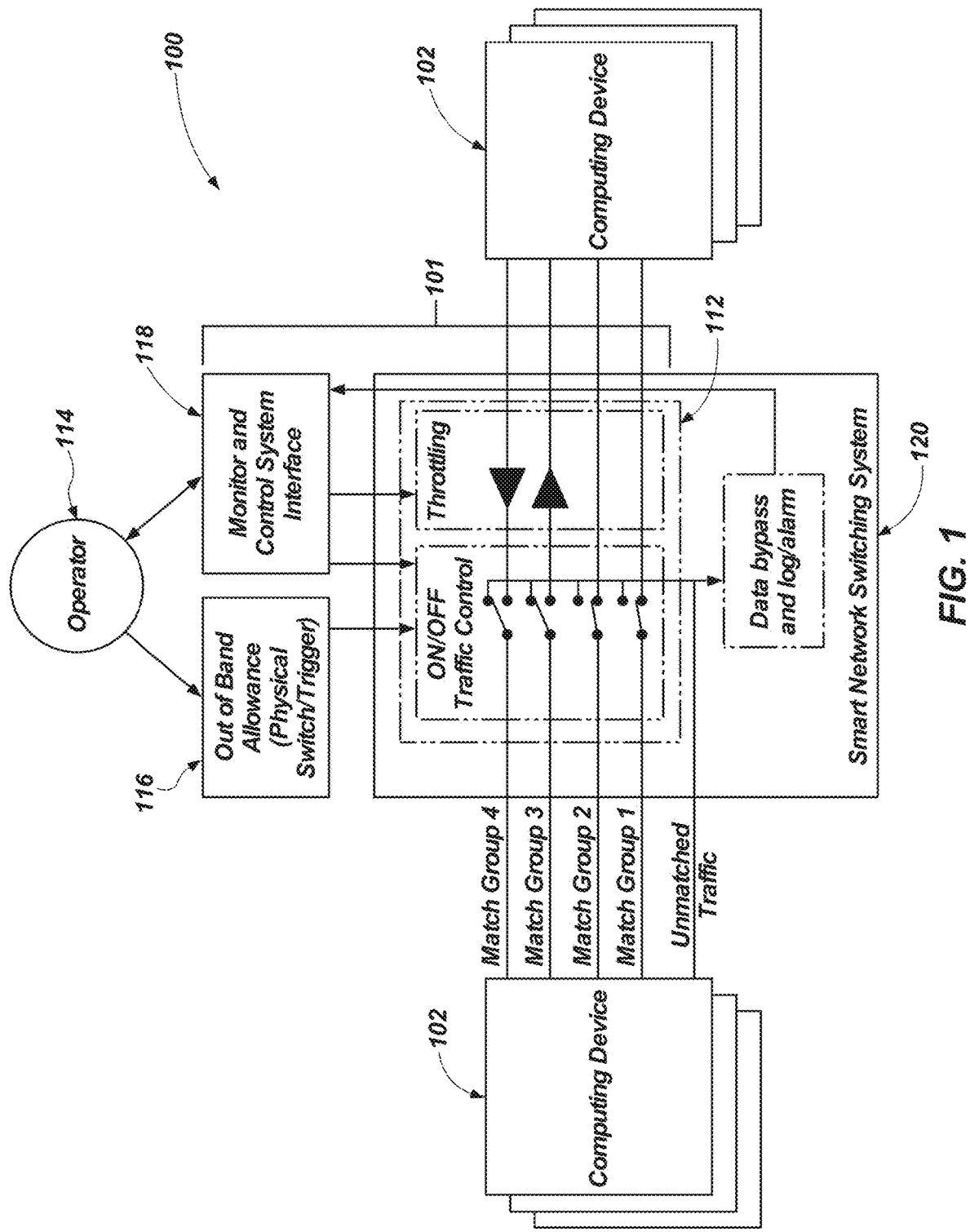
FIG. 1 illustrates a schematic diagram of an example communication system in which a traffic control system can operate in accordance with one or more embodiments of the present disclosure.

The illustrations presented herein are not actual views of any traffic control system, software-defined networking system, or any component thereof, but are merely idealized representations, which are employed to describe embodiments of the present disclosure.

As used herein, the singular forms following "a," "an," and "the" are intended to include the plural forms as well, unless the context clearly indicates otherwise.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features, and methods usable in combination therewith should or must be excluded.

As used herein, any relational term, such as "first," "second," etc., is used for clarity and convenience in understanding the disclosure and accompanying drawings, and does not connote or depend on any specific preference or order, except where the context clearly indicates otherwise.

As used herein, the term "substantially" in reference to a given parameter, property, or condition means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter, as well as variations resulting from manufacturing tolerances, etc.).

As used herein, the term "traffic" may refer to a flow of data (e.g., a stream of data packets) across a network and through a network switch at a given point in time.

Embodiments of the present disclosure include a hardware and software combination that provides a traffic control system for protecting industrial control systems against cyber-attacks, including unauthorized commands, remote vulnerability exploit and code execution, unauthorized remote configuration and/or firmware changes, man-in-the-middle attacks, and denial of service attacks. For instance, the traffic control system of the present disclosure replaces typical network switches conventionally present in industrial control systems with a smart industrial control system-aware switch (hereinafter "smart network switching system") that monitors and controls, in real time, the industrial control system's network flows. The smart network switching system is paired with a monitoring and control system (e.g., operator workstation) that enables a user (e.g., an operator) to perform out-of-band monitoring and control.

Some embodiments of the present disclosure include a smart network switching system having a software-defined networking system that enables monitoring and control at an application layer (i.e., protocol level, layers 5-7) of the traffic (i.e., data stream). The software-defined networking system may enable rules that are specific to an industrial control system to be created and to be changed in real time. Furthermore, the traffic control system may include an out-of-band monitoring and control system having a user device through which a user (e.g., operator) may interface with the traffic control system to monitor and control traffic through the smart network switching system. For instance, the smart network switching system may communicate with the monitoring and control system to provide an overview (e.g., operational picture) of the industrial control system and traffic flowing through the smart network switching system. Furthermore, the monitoring and control system may enable the user to control the traffic in real time while using an out-of-band channel to prevent the monitoring and control system from being compromised. The monitoring and control system enables the user to set levels of control for each endpoint of the industrial control system. Furthermore, the monitoring and control system enables the user to manage remote connectivity and may alarm when unauthorized traffic is detected on the network of the industrial control system.

One or more embodiments of the present disclosure includes a smart network switching system having a software-defined networking system that extends a control plane (e.g., plane utilized to modify how and if nodes can talk with each other) of the software-defined networking system to allow protocol level (layers 5-7) control of the data plane (e.g., plane where raw data traverses between nodes) of the software-defined networking system. As a result, embodiments of the present disclosure include a smart network switching system having a software-defined networking system that enables control of one or more operational technology protocols such as distributed network protocol ("DNP") 3.0.

FIG. 1 illustrates a schematic diagram of an example communication system 100 in which a traffic control system 101 can operate in accordance with one or more embodiments. For example, the traffic control system 101 may operate in an industrial control system (e.g., a control system associated with instrumentation utilized in one or more industrial process controls). As illustrated, the communication system 100 includes the traffic control system 101 and two or more computing devices 102. In one or more embodiments, the traffic control system 101 may include a smart network switching system 120, an out of band allowance 116, and a monitoring and control system 118.

In operation, the traffic control system 101 may communicate with (e.g., receive data from, process data from, and/or forward data to) two or more computing devices 102. For instance, the traffic control system 101 may control (e.g., filter, monitor, adjust, etc.) communication between the two or more computing devices 102. As a non-limiting example, the orientations and connections of the traffic control system 101 could provide for north-south communications between a human machine interface (HMI) and a field controller (PLC, RTU, etc.). The traffic control system 101 may also provide for east-west communications between peer devices on a network, such as an IEC 61850 connection between two relays. As is known in the art, multiple data cables may be plugged into ports of a network switch portion of the smart network switching system 120 to enable communication between different networked devices. Furthermore, the smart network switching system 120 may manage the flow of data across a network by transmitting a received network packet only to the one or more devices for which the packet is intended. Additionally, each networked device connected to the smart network switching system 120 can be identified by its network address, allowing the smart network switching system 120 to direct the flow of traffic thereby increasing the security and efficiency of the network.

As shown in FIG. 1, the smart network switching system 120 of the traffic control system 101 may include a software-defined networking system 112 (i.e., a system operating software-defined networking). Additionally, the smart network switching system 120 may include portions and/or entireties of any known switches known in the art in addition to the software-defined networking system 112 described herein. In some embodiments, as is described in greater detail below the software-defined networking system 112 of the smart network switching system 120 may separate protocol messages into match groups upon which different rule sets may be applied. For example, commands that have low risk associated with commands may be allowed by default to pass through the smart network switching system 120 and only disabled at the discretion of an operator (as described below). Relatively higher risk commands, on the other hand, may be disabled by default and only enabled at the direction and discretion of the operator. Furthermore, depending on determined (e.g., perceived) level of risk, certain commands that could be higher risk but would have limited consequences can be throttled back such that only a few unauthorized messages are allowed to pass through smart network switching system 120 before an operator 114 is alerted to take appropriate action. Traffic that matches none of the match group rulesets is denied by default and the smart network switching system 120 may be configured to generate an alarm in such instances.

In some embodiments, the smart network switching system 120 may include a multiport network bridge that utilizes hardware addresses to process and forward data at a data link layer (layer 2) of an Open Systems Interconnection ("OSI") model. Furthermore, the smart network switching system 120 may also process data at the network layer (layer 3) of the OSI and at the transport layer (layer 4). For instance, the smart network switching system 120 may include any multilayer switch known in the art. However, unlike conventional network switches, and as will be discussed in greater detail below in regard to FIG. 2, the software-defined networking system 112 of the smart network switching system 120 enables filtering, monitoring, and forwarding of data at the protocol level (layers 5-7) of the OSI networking specification.

The software-defined networking system 112 of the smart network switching system 120 may include portions and/or entireties of software-defined networking systems known in the art. For example, as is known in the art, the software-defined networking system 112 may separate a network's control or software-defined networking network policy (i.e., control plane) and forwarding planes (i.e., data planes), thus enabling the network control to become directly programmable and the underlying infrastructure to be abstracted for applications and network services. Furthermore, the software-defined networking system 112 may include a software-defined networking application, a software-defined networking controller, a software-defined networking data path, and a software-defined networking Control to Data-Plane Interface, as is known in the art. However, as is discussed in greater detail below in regard to FIG. 2, the software-defined networking system 112 of the present disclosure expands the control plane of the software-defined networking system 112 beyond conventional control planes to enable protocol level (i.e., layers 5-7) control of the data plane of the software-defined networking system 112. For example, the software-defined networking system 112 may monitor data packets to determine whether the data packets are authorized. As used herein, the term "authorized" and any derivative terms, when used in reference to a data packet, may indicate that the data packet includes any required permissions, tokens, signatures, certificates, origins, etc., to authorize the data packet. Furthermore, in additional embodiments, the term "authorized" and any derivative terms may indicate that the data packet merely does not include any unauthorized data, codes, strings, etc., at a protocol level of the data packets. As is discussed in greater detail below, the software-defined networking system 112 may flag any data packets that potentially may not be authorized.

Furthermore, as is discussed in greater detail below in regard to FIGS. 2-3C, the smart network switching system 120 may communicate with and may be operably coupled to the monitoring and control system 118. As will be understood in the art, the smart network switching system 120 may include one or more ports for connecting the smart network switching system 120 to the monitoring and control system 118, the out of band allowance 116, and the two or more computing devices 102. In some embodiments, the smart network switching system 120 may communicate information related to traffic (e.g., data packets) passing through the smart network switching system 120 at any of the layers described above to the monitoring and control system 118. Moreover, as shown in FIG. 1, the monitoring and control system 118 may include a user device, and the monitoring and control system 118 may display information related to the traffic on the user device. Furthermore, an operator 114 (e.g., an operator of the traffic control system 101) may use the monitoring and control system 118, for example, to monitor traffic being processed by the smart network switching system 120 and to manually deny identified data packets from being delivered and/or permit the identified data packets to be delivered. For example, the operator 114 may change the state of network flows using either the out of band allowance 116 or the monitoring and control system 118. In the case of the out of band allowance 116, a physical switch, a bar code reader, or similar non-networked device is used to change the state of one or more network flows. In the case of the monitoring and control system 118, the operator 114 can use the monitoring and control system 118 to either switch a particular command set on or off or alternatively throttle the communication of a particular message type by reducing its bandwidth or message rate using software-based controls.

In view of the foregoing, in some embodiments, the smart network switching system 120 may identify potentially unauthorized data packets, the monitoring and control system 118 may display information related to the potentially unauthorized data packets, and the operator 114 may utilize the monitoring and control system 118 or the out of band allowance 116 to expressly authorize the potentially unauthorized data packets to pass through the smart network switching system 120 or to prevent the potentially unauthorized data packets from passing through the smart network switching system 120. Although FIG. 1 illustrates only one operator 114 associated with the monitoring and control system 118, the communication system 100 can include any number of a plurality of users that each interact with the monitoring and control system 118. In some embodiments, the monitoring and control system 118 may represent various types of computing devices with which users can interact. For example, the monitoring and control system 118 may be a mobile device (e.g., a cell phone, a smartphone, a PDA, a tablet, a laptop, a watch, a wearable device, etc.). In some embodiments, however, the monitoring and control system 118 may be a non-mobile device (e.g., a desktop or server). Additionally, the monitoring and control system 118 may include one or more devices for presenting output to an operator (e.g., operator 114) of the traffic control system 101, including, but not limited to, a graphics engine, a display (e.g., a display screen), one or more output drivers (e.g., display drivers), one or more audio speakers, and one or more audio drivers. In certain embodiments, the monitoring and control system 118 is configured to provide graphical data to a display for presentation to the operator. The graphical data may be representative of one or more graphical user interfaces and/or any other graphical content as may serve a particular implementation. In one or more embodiments, the monitoring and control system 118 may provide the graphical data via a web browser interface as is discussed in the greater detail below in regard to FIGS. 3A-3C.

Referring still to FIG. 1, the two or more computing devices 102 may include any devices operated on the industrial control system. For instance, the one or more computing devices 102 may include controllers, desktop computers, mobile devices, lap top computers, printers, instruments, smart meters, remote terminal units, programmable logic controllers, protective relays, smart meters, digital fault recorders, routers, etc.

Figure 2:
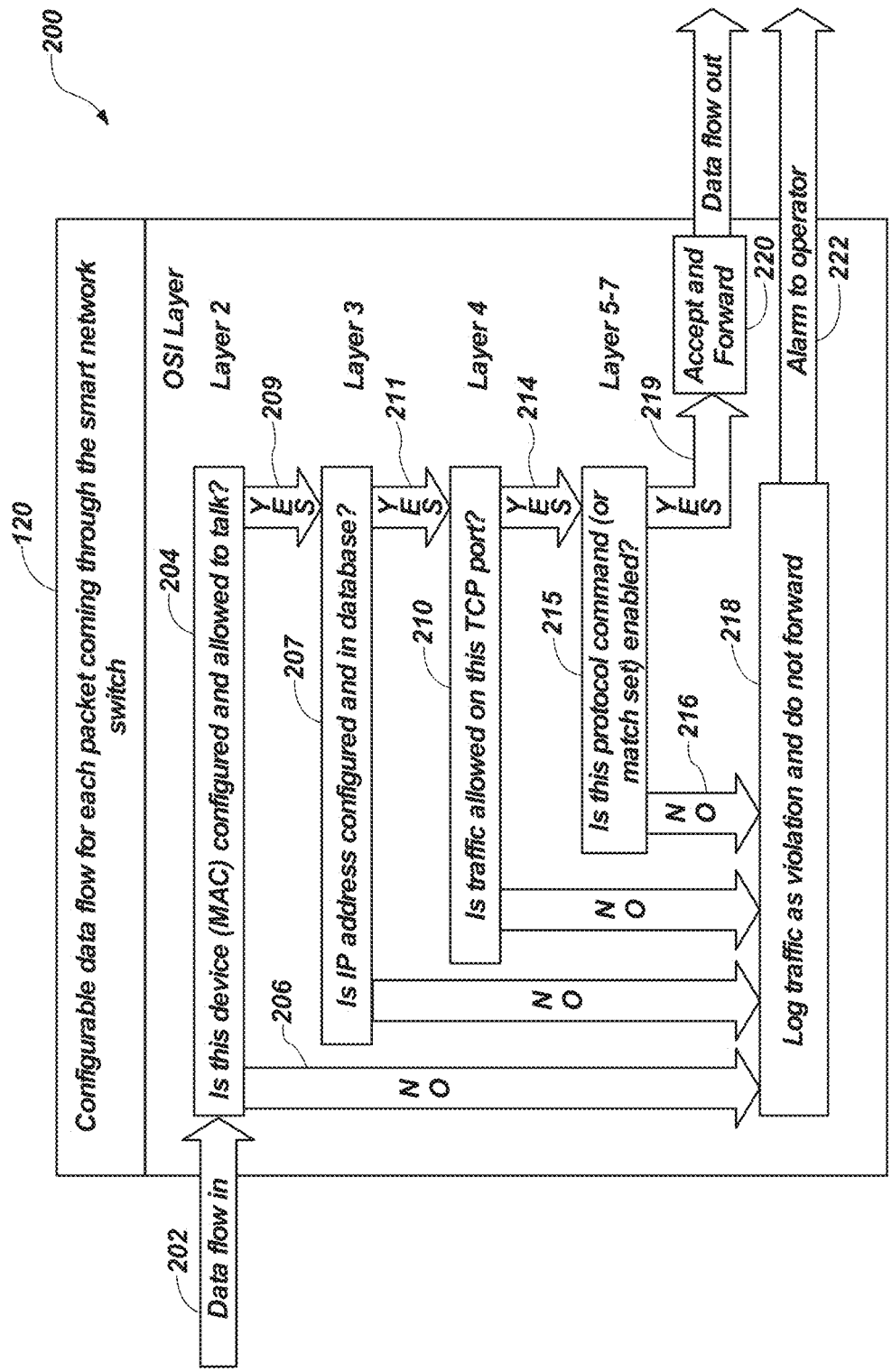
FIG. 2 shows example processes of the traffic control system via a schematic-flow diagram according to one or more embodiments of the present disclosure.

FIG. 2 shows example processes of the traffic control system 101 via a schematic-flow diagram. For instance, FIG. 2 shows one or more embodiments of a sequence-flow 200 that the traffic control system 101 utilizes to monitor and control, in real time, an industrial control system's network flows. As shown in FIG. 2, the traffic control system 101 may receive one or more data packets (e.g., data) (referred to hereinafter as "data packets") from a source, as shown in act 202. In other embodiments, the source(s) may include a computing device included within the industrial control system's network. As used herein the term "data packet" may refer to a basic unit of communication communicated over a digital network. For instance, a data packet may include one or more of a datagram, a segment, a block, a cell, and/or a frame depending on the protocol used for transmission of the data represented by the data packet. As is known in the art, when data is transmitted, the data is broken down in the similar structures of data before transmission (called "packets"), and the packets are reassembled to the original data one the packets are received at a destination device.

Upon receiving the data packets, the software-defined networking system 112 may determine whether the source device of the one more data packets is authorized to communicate on the industrial control system's network, as shown in act 204 of FIG. 2. In some embodiments, the software-defined networking system 112 may analyze packet attributes such as, for example, a source IP address, a source port, a destination IP address or port, a destination service like HTTP or FTP to determine whether the source device is authorized to communicate on the industrial control system's network. For example, the software-defined networking system 112 may analyze a media access control ("MAC") address of the source and may determine whether the MAC address is authorized to communicate on the network. As another non-limiting example, the software-defined networking system 112 may include a layer 2 firewall that operates at the layer 2 of the OSI model. In additional embodiments, the software-defined networking system 112 may determine whether the source device is authorized to communicate on the industrial control system's network via any manner known in the art and may include any layer-2 firewall known in the art.

Referring still to FIG. 2, if the software-defined networking system 112 determines that the source device is unauthorized to communicate on the industrial control system's network, as shown in act 206 of FIG. 2, the software-defined networking system 112 may log the data packets as a network violation and may not forward the data packets to a destination device, as shown in act 218. Additionally, the software-defined networking system 112 may determine that the source device is authorized to communicate on the industrial control system's network, as shown in act 209 of FIG. 2.

Furthermore, if the software-defined networking system 112 determines that the source IP address is not authorized to communicate on the industrial control system's network, as shown in act 207 of FIG. 2, the software-defined networking system 112 may log the data packets as a network violation and may not forward the data packets to a destination device, as shown in act 218. The software-defined networking system 112 may determine whether the data packets and/or traffic in general is authorized on a transport control protocol ("TCP") port as well. As another non-limiting example, the software-defined networking system 112 may perform a stateful packet inspection (i.e., dynamic packet inspection) on the data packets and/or traffic to monitor the state of active connections and may utilize this information to determine which of the data packets are authorized to be communicated on a particular port, as is known in the art.

If the software-defined networking system 112 determines that data packets are not unauthorized to be communicated on the port through which the data packets were received, as shown in act 210 of FIG. 2, the software-defined networking system 112 may log the data packets as a network violation and may not forward the data packets to a destination device, as shown in act 218 of FIG. 2. Additionally, the software-defined networking system 112 may determine that the data packets are authorized to be communicated on the port through which the data packets were received, as shown in act 211 of FIG. 2.

If, conversely, the software-defined networking system 112 determines that the port is authorized for communication (i.e., traffic is allowed on this TCP port), as shown in act 214 of FIG. 2, the software-defined networking system 112 determines whether the data packets are authorized at a protocol level (i.e., layers 5-7) of the data packets, as shown in act 215. In some embodiments, determining whether the data packets are authorized at a protocol level may include analyzing the data packets with a deep packet inspection operating at the application layer. In some embodiments, the deep packet inspection may include disassembling the data packets, analyzing the data of the data packets, comparing the data to set criteria (e.g., tables and/or rules), and then re-assembling the data packets. In some embodiments, the deep packet inspection may include analyzing the data packets' headers, footers, and payload (i.e., stripping down the headers, footers, and payload) to perform signature matching, searches for specific strings, etc. As a non-limiting example, the deep packet inspection performed by the software-defined networking system 112 may include any deep packet inspection known in the art. For instance, the deep packet inspection may include analyzing the headers, footers, and payload for non-compliance to protocol, spam, viruses, intrusions, harmful code, and any other pre-defined criteria. As a non-limiting example, the software-defined networking system 112 may determine whether the data packets include a potentially dangerous command in the operational technology ("OT") protocol. As a result, the deep packet inspection may enable the software-defined networking system 112 and/or an operator (discussed below) to identify, categorize, reroute, and/or stop data packets based on the packets' code and/or data.

Referring still to act 215, in some embodiments, determining whether the data packets are authorized at a protocol level may include identifying an application that produced the one or more data packets via the deep packet inspection. Additionally, determining whether the data packets are authorized at a protocol level may include utilizing deep packet capture technologies to collect the data packets in memory of the software-defined networking system 112 and subsequently analyzing the data packets via the deep packet inspection. Moreover, determining whether the data packets are authorized at a protocol level may include comparing the data packets against sets of known applications and their corresponding data packet stream patterns via the deep packet inspection. Furthermore, determining whether the data packets are authorized at a protocol level may include examining how the data packets are being exchanged between a source device and a destination device. For instance, the deep packet inspection performed by the software-defined networking system 112 may identify spikes and bursts of traffic between the source device and the destination device and may correlate the traffic patterns against expected patterns. If the norms of expected patterns are exceeded, the software-defined networking system 112 may generate an alarm to alert the operator. At a more extreme level, such as in the case of a denial of service attack, a high level of traffic may be configured to prevent the source device from communicating further until the operator again allows it.

In one or more embodiments, the deep packet inspection may be table based and/or rule based. In other words, the deep packet inspection may utilize switching tables and routing tables to filter the packets. For instance, the deep packet inspection may include disassembling the data packets and comparing the packets, byte by byte, to one or more tables of rules to identify unauthorized code and/or data. In some embodiments, the one or more tables may include rules related to unauthorized strings, data, codes, commands, etc. In other embodiments, the one or more tables may include rules related to preauthorized strings, data, codes, commands, etc. In one or more embodiments, the one or more tables of rules may be specific to particular portions (e.g., parts) of a protocol and may be utilized to authorize portions of the protocol.

As a non-limiting example, the deep packet inspection may include comparing the data packets, byte by byte, to a first table of rules to determine whether the packets include specific authorized data and/or include unauthorized data at the protocol level. If the deep packet inspection does not result in any unauthorized data based on the comparison to the first table of rules, the software-defined networking system 112 may forward the packets to a second table of rules or the destination device. If the software-defined networking system 112 forwards the packets to a second table of rules, the software-defined networking system 112, via the deep packet inspection may compare the packets, byte by byte, to the second table of rules to determine whether the packets include specific authorized data and/or include unauthorized data at the protocol level. The foregoing process may repeat itself for any number of tables of rules until the packet is fully authorized or is found to be unauthorized. In one or more embodiments, upon determining the packets are unauthorized, the software-defined networking system 112 may simply not forward the packets to any other tables. In additional embodiments, upon determining the packets are unauthorized, the software-defined networking system 112 may forward the packets to a specific table representing unauthorized packets. In further embodiments, upon determining the packets are unauthorized, the software-defined networking system 112 may capture the packets in memory for further analysis. In yet further embodiments, upon determining the packets are unauthorized, the software-defined networking system 112 may log the packets for future analysis or delete the packets.

In view of the foregoing, determining whether the data packets are authorized may be solely based on determining whether the data packets include only explicitly authorized data indicated in the tables. For instance, the tables may include explicitly authorized data, and the traffic control system 101 may not forward any data packets including anything but the explicitly authorized data. As a result, in some embodiments, the software-defined networking system 112 may not utilize any algorithms, rights, signatures, tokens, etc., in determining unauthorized traffic. Rather, in one or more embodiments, if the data packets of the traffic are not explicitly authorized, the traffic is unauthorized. In additional embodiments, the software-defined networking system 112 may utilize any algorithms, rights, tokens, signatures, etc., known in the art for determining unauthorized traffic.

In one or more embodiments, the deep packet inspection may include one or more of a port-based deep packet inspection, a statistical deep packet inspection, and an automation-based deep packet inspection, which are known in the art. The port-based deep packet inspection may include a standard protocol identification approach, which inspects port fields in the transmission control protocol ("TCP") and/or user datagram protocol ("UDP") headers for commonly assigned port numbers to the respective protocol. The statistical deep packet inspection may include inspecting a classification of the traffic (e.g., data packets) rather than a payload and gathering generic information like a packet length and/or port numbers to classify the traffic. The automation based deep packet inspection may include utilizing a finite state machine for pattern matching. The finite state matching includes the following states: initial state, acceptance state for matching the patterns, and intermediate states for partial matching cases. Matching begins with the initial state when a payload string enters the automation engine, and if the process reaches the final state, it indicates that the match is found.

Referring still to FIG. 2, if the software-defined networking system 112 determines that the data packets are unauthorized at a protocol level, as shown in act 216 of FIG. 2, the software-defined networking system 112 may log the data packets as a network violation and may not forward the data packets to a destination device, as shown in act 218. Furthermore, in one or more embodiments, the monitoring and control system 118 may alarm upon detecting unauthorized traffic.

If, on the other hand, the software-defined networking system 112 determines that the data packets are authorized at a protocol level, as shown in act 219 of FIG. 2, the software-defined networking system 112 may accept and forward to the data packets to a destination device, as shown in act 220 of FIG. 2. For instance, the software-defined networking system 112 may forward the data packets to a computing device 102 of the two or more computing devices 102 of the industrial control system. In view of the foregoing, in some embodiments, if the software-defined networking system 112 logs the data packets as a network violation, the software-defined networking system 112 may further generate and provide an alarm to the monitoring and control system 118, as shown in act 222 of FIG. 2.

As noted above in regard to FIG. 1, the software-defined networking system 112 may be in communication with the monitoring and control system 118 and may provide information related to traffic through the smart network switching system 120 to the monitoring and control system 118 for display to an operator 114 (e.g., an operator, network administrator, etc.). The monitoring and control system 118 may be out-of-band relative to the data packets flowing through the smart network switching system 120, thus, preventing a compromise of the monitoring and control system 118. For instance, a port (e.g., a trunk port) through which the monitoring and control system 118 is connected to the smart network switching system 120 may be logically separated from other ports of the smart network switching system 120. Furthermore, the monitoring and control system 118 may enable an operator 114 to expressly authorize and/or reject a data packet received at the smart network switching system 120. In other words, the monitoring and control system 118 provides out-of-band control of the traffic flowing through the smart network switching system 120.

For instance, as will be discussed in greater detail in regard to FIGS. 3A-3C, upon receiving a data packet, the software-defined networking system 112 may provide any information obtained via any analysis performed on the data packets to the monitoring and control system 118. For example, the software-defined networking system 112 may provide any information obtained via acts 204, 207, 210, and 215 of FIG. 2 to the monitoring and control system 118 for display to an operator 114. In some embodiments, the software-defined networking system 112 may provide any information obtained via acts 204, 207, 210, and 215 of FIG. 2 to the monitoring and control system 118 for display to an operator 114 via a web browser or similar application. In operation, based on a review of the information provided to the monitoring and control system 118 concerning a data packet, the operator 114 may determine whether to accept (e.g., authorize) the data packet or to deny the data packet. For instance, the monitoring and control system 118 may include a user interface (e.g., mouse, keyboard, touch screen, etc.) where an operator 114 may input user interactions accepting or denying the data packet. Upon receiving a user interaction from the operator 114, the monitoring and control system 118 may provide the user interaction to the smart network switching system 120. For example, the monitoring and control system 118 may provide a response communication to the smart network switching system 120 indicating whether the data packets have been accepted or denied. As a result, the combination of the smart network switching system 120 and the monitoring and control system 118 gives direct control of the traffic to an operator in real-time.

Figure 3A:
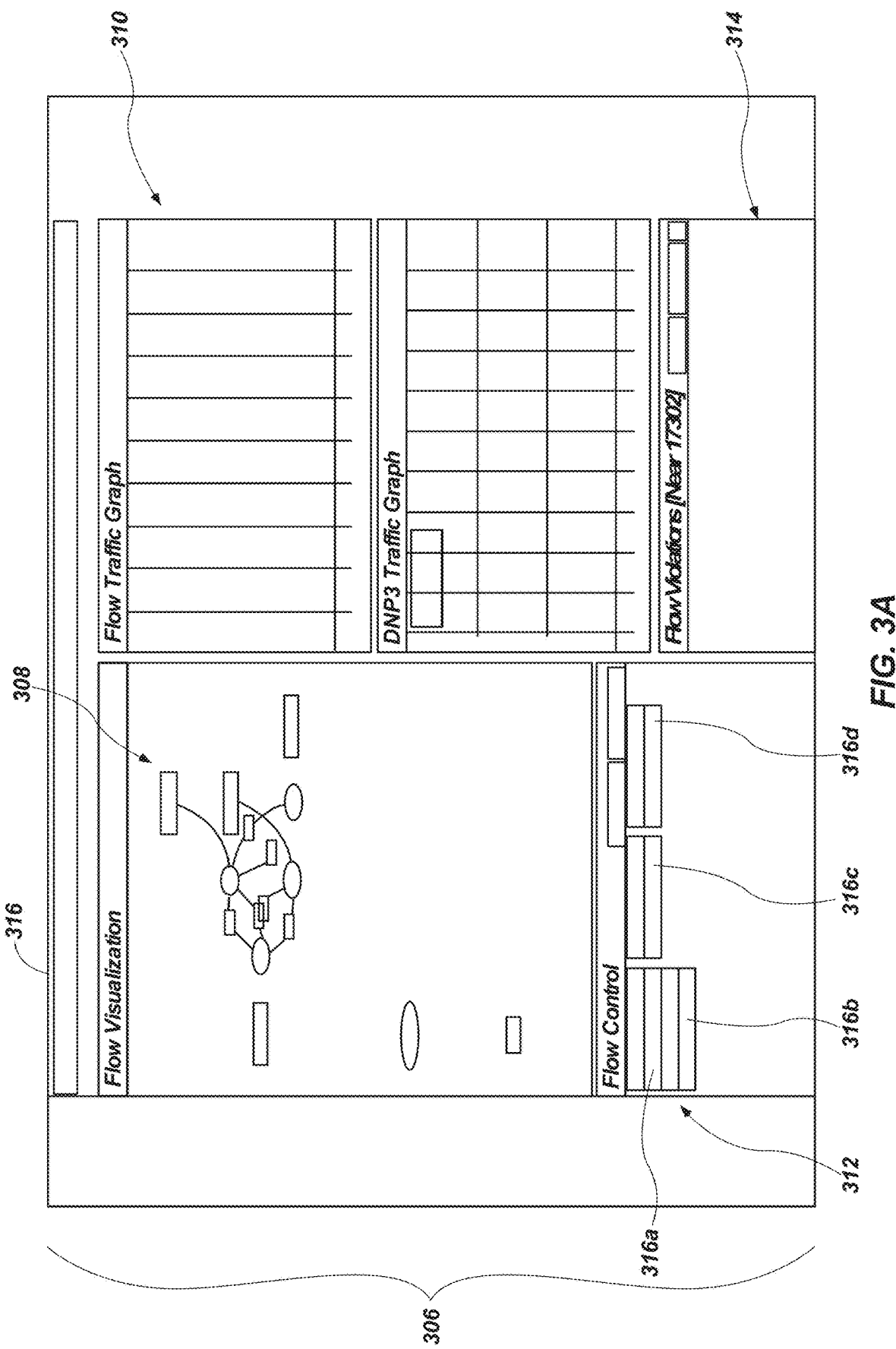
FIGS. 3A-3C show graphical user interfaces that the traffic control system may display for viewing by a user according to one or more embodiments of the present disclosure.
Figure 3B:
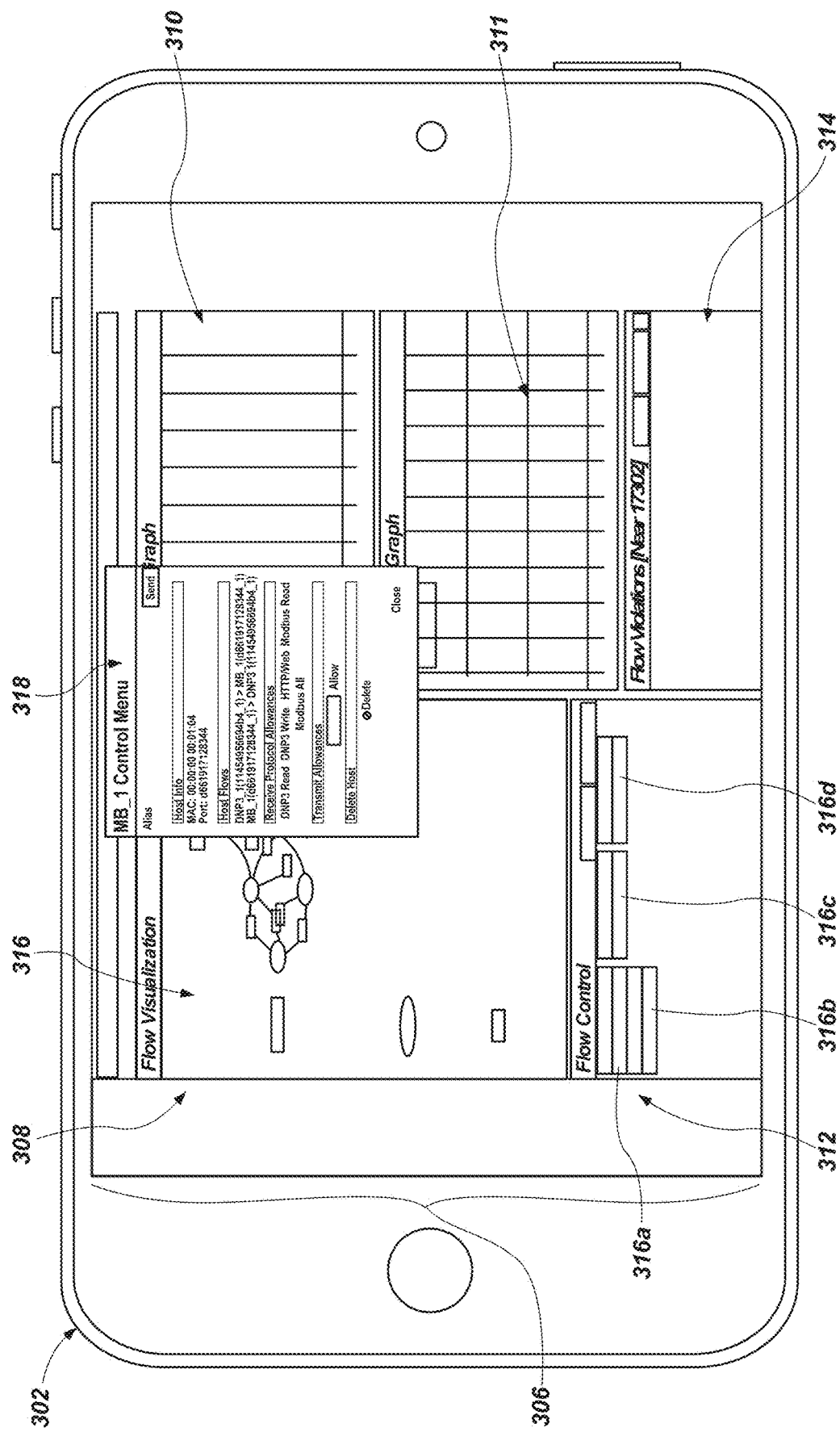
Figure 3C:
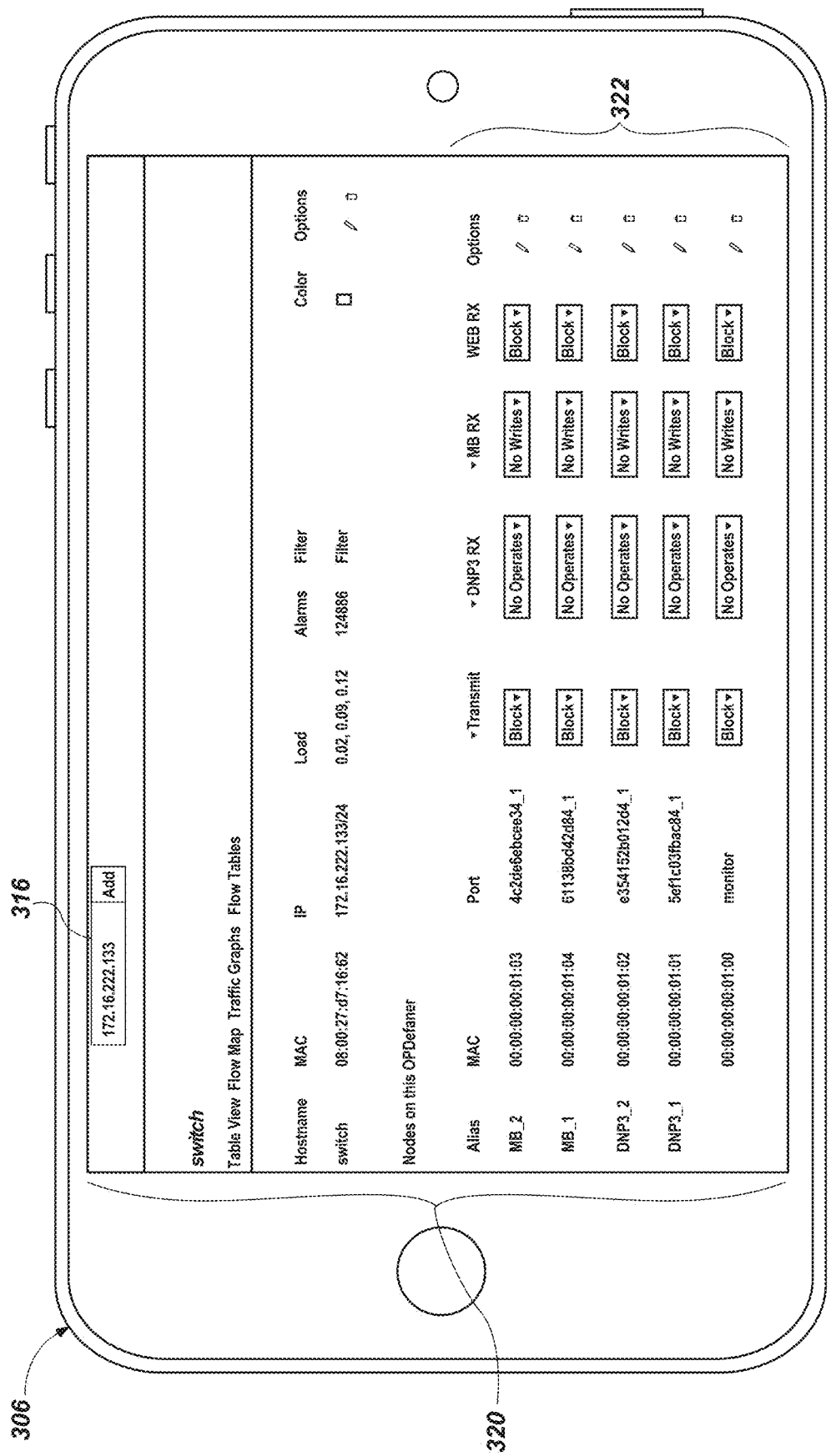

FIGS. 3A-3C show a plurality of user interfaces including features of the communication system 100 according to embodiments of the present disclosure. As will be described in more detail below, the components of the communication system 100 as described in regard to FIGS. 1 and 2 can provide, alone and/or in combination with the other components, one or more graphical user interfaces ("GUIs"). In particular, the components can allow the operator 114 to interact with a collection of display elements for a variety of purposes. In particular, FIGS. 3A-3C and the description that follows illustrate various example embodiments of the user interfaces and features that are in accordance with one or more embodiments of the present disclosure.

For example, FIG. 3A illustrates an exemplar of a user device 302 that may implement one or more of the components or features of the communication system 100. In some embodiments, the user device 302 may include a desktop or laptop computer. In other embodiments, as shown in FIG. 3A, in some embodiments, the user device 302 may include a handheld device, such as a mobile phone device (e.g., a smartphone). As used herein, the term "handheld device" refers to a device sized and configured to be held/operated in a single hand of a user. In additional or alternative examples, however, any other suitable computing device, such as, but not limited to, a tablet device, larger wireless device, a personal digital assistant device, and/or any other suitable computing device can perform one or more of the processes and/or operations described herein. The user device 302 includes a display 316 that allows for user monitoring and control and displays interfaces. Furthermore, the user device 302 receives and/or detects operator 114 input via input from a mouse, keyboard, and/or touchscreen. As used herein, a "touch screen display" refers to the display of a touch screen device. In one or more embodiments, a touch screen device may be the user device 302 with at least one surface upon which a user 114 may perform touch gestures (e.g., a laptop, a tablet computer, a personal digital assistant, a media player, a mobile phone, etc.). Additionally or alternatively, the user device 302 may include any other suitable input device, such as those described below with reference to FIG. 4.

As shown in FIG. 3B, the touch screen display 316 of the user device 302 displays a monitoring and control system GUI 306 (e.g., provided by a monitoring and control system application installed on the user device 302). In some embodiments, the monitoring and control system GUI 306 may be displayed via a web browser application (e.g., CHROME, MOZILLA, INTERNET EXPLORER, etc.). The monitoring and control system GUI 306 can be configured to display a flow visualization window 308, a general flow traffic graph 310, a protocol-specific graph 311, a flow control window 312, and a list of flow violations 314. The flow visualization window 308 may display current flows between computing devices 102 of an industrial control system for a quick reference for an operator 114. The flow traffic graph 310 may show levels of flows between computing devices 102 of the industrial control system. In some embodiments, the flow traffic graph may be separated based on traffic type (e.g., by protocol command type). The flow control window 312 may include a plurality of selectable elements 316a-316d representing ports of and devices connected to the smart network switching system 120. Furthermore, the list of flow violations 314 may include a list of violations identified via any of the manners described above in regard to FIG. 2.

Upon selection of a selectable element 316a-316d of the flow control window 312, the monitoring and control system 118 may display a respective control menu GUI 318. The respective control menu GUI 318 may include information related to the respective port of the smart network switching system 120, host information, host flows (e.g., current flows), types of protocols allowed in regard to the host, and transmit allowances.

In some embodiments, the monitoring and control system 118 may also display an additional monitoring and control system GUI 320. The additional monitoring and control system GUI 320 may include a list 322 of devices connected to the switch and various selectable elements for blocking traffic to and/or from any of the devices. Thus, the operator 114 (e.g., operator) may monitor traffic flowing through the smart network switching system 120 and may, in real-time, control traffic through the smart network switching system 120 using the monitoring and control system 118 or by using an out of band allowance (e.g., physical switch). Additionally, the operator 114 may choose to throttle certain command types to prevent proliferation of unauthorized commands on the network.

Referring to FIGS. 1-3C together, the traffic control system 101 of the present disclosure may provide advantages over conventional control systems. For example, unlike conventional systems, the traffic control system 101, due to the software-defined networking system 112, may be scalable to protect systems having thousands of individual endpoints monitoring hundreds of thousands of input/output points. Additionally, the smart network switching system 120 may be utilized to replace traditional switches and/or may be used in conjunction with them. In the latter case, encrypted virtual private network (VPN) tunnels are used to connect two or more smart switches using the traditional network as a backbone. Additionally, because the monitoring and control system 118 is an out-of-band management station, the traffic control system 101 enables out-of-band administration unlike conventional systems. Moreover, because the traffic control system 101 includes a software-defined networking system 112, which is directly programmable and customizable, the traffic control system 101 may be customized to fit any given industrial control system and to function utilizing and monitoring one or more industrial control system protocols (e.g., DNP3, Modbus, ICCP, Profinet, Ethernet/IP, etc.).

Figure 4:
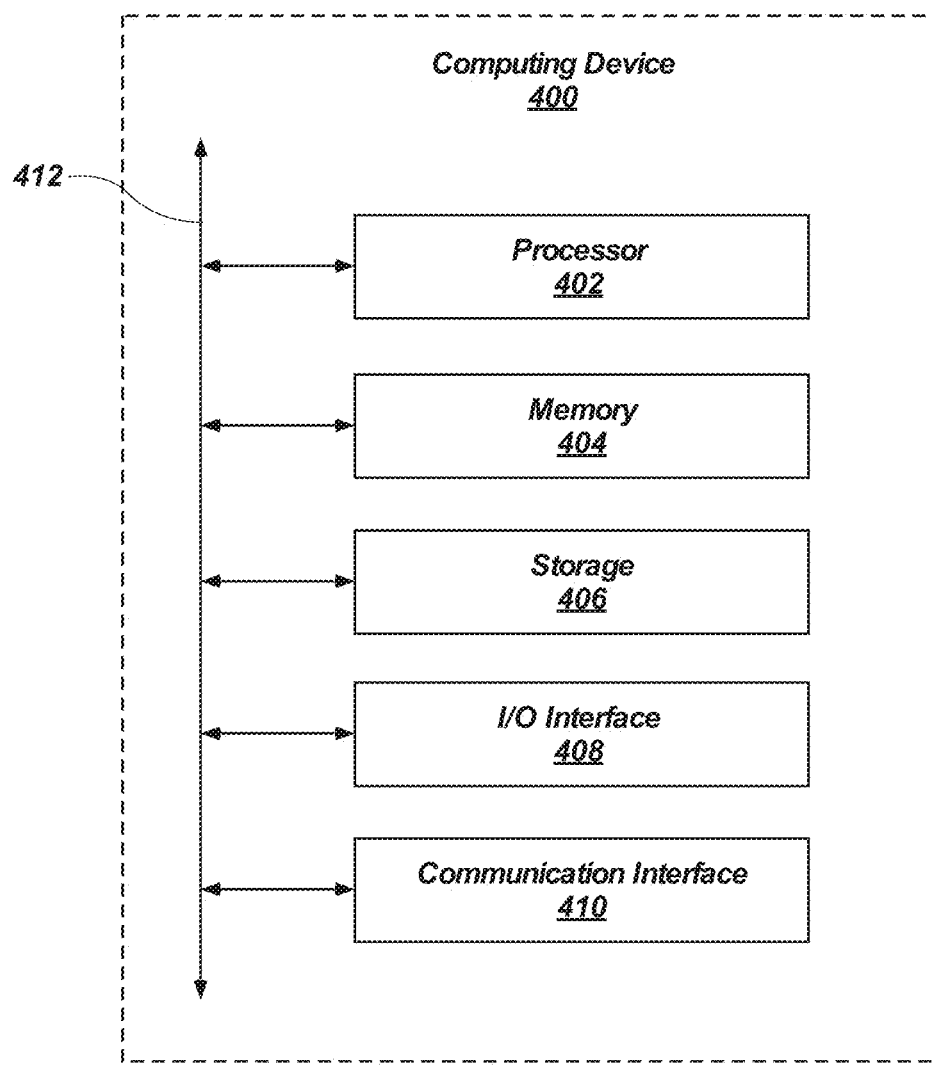
FIG. 4 is a block diagram of a monitoring and control system according to one or more embodiments of the present disclosure.

FIG. 4 is a block diagram of a monitoring and control system 118 according to one or more embodiments of the present disclosure. One will appreciate that one or more computing devices 400 may implement the monitoring and control system 118. The monitoring and control system 118 can comprise a processor 402, a memory 404, a storage device 406, an I/O interface 408, and a communication interface 410, which may be communicatively coupled by way of a communication infrastructure 412. While an exemplary computing device is shown in FIG. 4, the components illustrated in FIG. 4 are not intended to be limiting. Additional or alternative components may be used in other embodiments. Furthermore, in certain embodiments, the computing device 400 can include fewer components than those shown in FIG. 4. Components of the computing device 400 shown in FIG. 4 will now be described in additional detail.

In one or more embodiments, the processor 402 includes hardware for executing instructions, such as those making up a computer program. As an example and not by way of limitation, to execute instructions, the processor 402 may retrieve (or fetch) the instructions from an internal register, an internal cache, the memory 404, or the storage device 406 and decode and execute them. In one or more embodiments, the processor 402 may include one or more internal caches for data, instructions, or addresses. As an example and not by way of limitation, the processor 402 may include one or more instruction caches, one or more data caches, and one or more translation lookaside buffers (TLBs). Instructions in the instruction caches may be copies of instructions in the memory 404 or the storage device 406.

The memory 404 may be used for storing data, metadata, and programs for execution by the processor(s). The memory 404 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 404 may be internal or distributed memory.

The storage device 406 includes storage for storing data or instructions. As an example and not by way of limitation, storage device 406 can comprise a non-transitory storage medium described above. The storage device 406 may include a hard disk drive (HDD), a floppy disk drive, flash memory, an optical disc, a magneto-optical disc, magnetic tape, or a Universal Serial Bus (USB) drive or a combination of two or more of these. The storage device 406 may include removable or non-removable (or fixed) media, where appropriate. The storage device 406 may be internal or external to the computing device 400. In one or more embodiments, the storage device 406 is non-volatile, solid-state memory. In other embodiments, the storage device 406 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 408 allows an operator 114 to provide input to, receive output from, and otherwise transfer data to and receive data from computing device 400. The I/O interface 408 may include a mouse, a keypad or a keyboard, a touch screen, a camera, an optical scanner, network interface, modem, other known I/O devices or a combination of such I/O interfaces. The I/O interface 408 may include one or more devices for presenting output to an operator 114, including, but not limited to, a graphics engine, a display (e.g., a display screen), one or more output drivers (e.g., display drivers), one or more audio speakers, and one or more audio drivers. In certain embodiments, the I/O interface 408 is configured to provide graphical data to a display for presentation to an operator 114. The graphical data may be representative of one or more graphical user interfaces and/or any other graphical content as may serve a particular implementation.

The communication interface 410 can include hardware, software, or both. In any event, the communication interface 410 can provide one or more interfaces for communication (such as, for example, packet-based communication) between the computing device 400 and one or more other computing devices or networks. As an example and not by way of limitation, the communication interface 410 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 410 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 410 may facilitate communications with a wireless PAN (WPAN) (such as, for example, a BLUETOOTH® WPAN), a WI-FI network, a WI-MAX network, a cellular telephone network (such as, for example, a Global System for Mobile Communications (GSM) network), or other suitable wireless network or a combination thereof.

Additionally, the communication interface 410 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), user Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 412 may include hardware, software, or both that couples components of the computing device 400 to each other. As an example and not by way of limitation, the communication infrastructure 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Embodiments of the present disclosure further include the following embodiments:

Embodiment 1: A method, comprising: receiving one or more data packets at a smart network switching system operating software-defined networking; analyzing the one or more data packets at a protocol level within a control plane of the software-defined networking; based on the analysis, determining whether the one or more data packets are authorized data packets; and forwarding a data packet of the one or more data packets to a destination device within a data plane of the software-defined networking upon determining that the data packet is an authorized data packet.

Embodiment 2: The method of embodiment 1, wherein analyzing the one or more data packets comprises performing a deep packet inspection at the protocol level of the one or more data packets.

Embodiment 3: The method of embodiment 2, wherein performing a deep packet inspection comprises: analyzing the one or more data packets; and determining, byte by byte, whether the one or more data packets are authorized data packets.

Embodiment 4: The method of any one of embodiments 1-3, wherein performing a deep packet inspection comprises: comparing protocols of the one or more data packets to one or more tables to determine whether the one or more data packets are authorized data packets.

Embodiment 5: The method of any one of embodiments 1-4, wherein determining whether the one or more data packets are authorized data packets may include determining whether the data packet includes an unauthorized command.

Embodiment 6: The method of any one of embodiments 1-5, further comprising, upon determining that a data packet of the one or more data packets is an unauthorized data packet, not forwarding the data packet to a destination device and logging the data packet as a network violation.

Embodiment 7: The method of any one of embodiments 1-6, further comprising providing information related to the analysis of the one or more data packets to an out-of-band monitoring and control system for display to a user.

Embodiment 8: The method of any one of embodiments 1-7, wherein determining whether the one or more data packets are authorized data packets comprises: providing information related to the analysis of the one or more data packets to an out-of-band monitoring and control system for display to a user; and receiving a response communication from the out-of-band monitoring and control system indicating whether the one or more data packets are authorized data packets.

Embodiment 9: A traffic control system, comprising: a smart network switching system comprising a software-defined networking system, the software-defined networking system comprising: at least one processor; and at least one non-transitory computer-readable storage medium storing instructions thereon that, when executed by the at least one processor, cause the software-defined networking system to: receive one or more data packets; and analyze the one or more data packets at a protocol level within a control plane of the software-defined networking system; and an out-of-band monitoring and control system in communication with the smart network switching system and comprising: at least one additional processor; and at least one additional non-transitory computer-readable storage medium storing instructions thereon that, when executed by the at least one additional processor, cause the monitoring and control system to: receive information related to the analysis of the one or more data packets performed by the network switch; display the information within a graphical user interface for display to a user; receive a user interaction indicating whether the one or more data packets are authorized data packets; and provide a response communication to the smart network switching system indicating whether the one or more data packets are authorized data packets.

Embodiment 10: The traffic control system of embodiment 9, wherein analyzing the one or more data packets comprises performing a deep packet inspection at the protocol level of the one or more data packets.

Embodiment 11: The traffic control system of any one of embodiments 9 or 10, wherein, the software-defined networking system further comprises instructions, that when executed by the at least one processor, cause the software-defined networking system to, in response to receiving a response communication indicating that the one or more data packets is an authorized data packet, forwarding the one or more data packets to a destination device.

Embodiment 12: The traffic control system of any one of embodiments 9-11, wherein, the software-defined networking system further comprises instructions, that when executed by the at least one processor, cause the software-defined networking system to, in response to receiving a response communication indicating that the one or more data packets are unauthorized data packets, not forwarding the one or more data packets to a destination device and logging the one or more data packets as a network violation.

Embodiment 13: The traffic control system of any one of embodiments 9-12, wherein, the software-defined networking system further comprises instructions, that when executed by the at least one processor, cause the software-defined networking system to determine whether a source device of the one or more data packets is authorized to communicate on an industrial control system.

Embodiment 14: The traffic control system of any one of embodiments 9-13, wherein, the software-defined networking system further comprises instructions, that when executed by the at least one processor, cause the software-defined networking system to determine whether a port through which the one or more data packets were received is authorized to receive traffic.

Embodiment 15: A non-transitory computer readable medium storing instructions thereon that, when executed by at least one processor, cause the at least one processor to perform steps comprising: receive one or more data packets at a network switch; analyze the one or more data packets at a protocol level via software-defined networking; and determine whether the one or more data packets are authorized data packets.

Embodiment 16: The non-transitory computer readable medium of embodiment 15, further comprising instructions that, when executed by the at least one processor, cause the at least one processor to, upon determining that the one or more data packets are authorized, forward the one or more data packets to a destination device.

Embodiment 17: The non-transitory computer readable medium of any one of embodiments 15 or 16, wherein analyzing the one or more data packets at a protocol level comprises: disassembling the one or more data packets; and comparing the data of the one or more data packets to one or more switching tables.

Embodiment 18: The non-transitory computer readable medium of any one of embodiments 15-17, further comprising instructions that, when executed by the at least one processor, cause the at least one processor to: upon determining that the one or more data packets are unauthorized, forward the one or more data packets to a table; and logging the one or more data packets as a network violation.

Embodiment 19: The non-transitory computer readable medium of any one of embodiments 15-18, further comprising instructions that, when executed by the at least one processor, cause the at least one processor to provide information related to the one or more data packets to an out-of-band monitoring and control system for display to a user.

Embodiment 20: The non-transitory computer readable medium of embodiment 19, further comprising instructions that, when executed by the at least one processor, cause the at least one processor to, in response to receiving a response communication from the out-of-band monitoring and control system authorizing the one or more data packets, forwarding the one or more data packets to a destination device.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternate useful combinations of the elements described, will become apparent to those skilled in the art from the description. Such modifications and embodiments also fall within the scope of the appended claims and equivalents.

What is claimed is:

1. A method, comprising:
   receiving one or more data packets at a virtualized smart network switching system comprising a software-defined networking system;
   analyzing the one or more data packets at a protocol level within a data plane of the software-defined networking system; and
   based on the analysis, separating protocol command messages into match groups upon which different rule sets are applied and determining whether the one or more data packets are authorized data packets associated with an authorized command utilizing a respective rule set applied to the one or more data packets associated with a respective match group for each of the one or more data packets.

2. The method of claim 1, further comprising:
   forwarding a data packet of the one or more data packets to a destination within the data plane of the software-defined networking system upon determining that the data packet is an authorized data packet associated with an authorized command; and
   not forwarding the data packet of the one or more data packets upon determining that the data packet is an unauthorized data packet associated with an unauthorized command and logging the data packet as a network violation.

3. The method of claim 1, wherein analyzing the one or more data packets at a protocol level within the data plane of the software-defined networking system comprises: analyzing the one or more data packets with a deep packet inspection operating at an application layer.

4. The method of claim 3, wherein analyzing the one or more data packets with the deep packet inspection comprises:
   analyzing the one or more data packets; and
   determining, byte by byte, whether the one or more data packets are authorized data packets.

5. The method of claim 1, further comprising:
   providing information related to the analysis of the one or more data packets to a software-defined out-of-band monitoring and control system of the virtualized smart network switching system for display to a user; and
   receiving a response communication from the software-defined out-of-band monitoring and control system to forward the one or more data packets based on one or more inputs received from a user at the software-defined out-of-band monitoring and control system.

6. The method of claim 1, wherein each of the different rule sets includes explicitly authorized data indicated in a table.

7. The method of claim 6, further comprising denying by default any data packet of the one or more data packets unassociated with the match groups.

8. A virtualized traffic control system, comprising:
   a software-defined networking system comprising:
      at least one processor; and
      at least one non-transitory computer-readable storage medium storing instructions thereon that, when executed by the at least one processor, cause the software-defined networking system to:
         receive one or more data packets;
         analyze the one or more data packets at a protocol level within a data plane of the software-defined networking system; and
         based on the analysis, separate protocol command messages into match groups upon which different rule sets are applied and determine whether the one or more data packets are authorized data packets associated with an authorized command utilizing a respective rule set applied to the one or more data packets associated with a respective match group for each of the one or more data packets.

9. The virtualized traffic control system of claim 8, further comprising:
   a software-defined out-of-band monitoring and control system in communication with the software-defined networking system and comprising:
   at least one additional processor; and
   at least one additional non-transitory computer-readable storage medium storing instructions thereon that, when executed by the at least one additional processor, cause the software-defined out-of-band monitoring and control system to:
   receive information related to the analysis of the one or more data packets performed by the software-defined networking system;
   cause the information to display within a graphical user interface for a user;
   receive a user interaction indicating whether to forward the one or more data packets based on one or more inputs received from a user; and
   provide a response communication to the software-defined networking system indicating to forward the one or more data packets identified from the one or more inputs received from the user.

10. The virtualized traffic control system of claim 9, wherein, the software-defined networking system further comprises instructions, that when executed by the at least one processor, cause the software-defined networking system to, in response to receiving the response communication indicating to forward the one or more data packets identified from the one or more inputs received from the user, not forwarding one or more other data packets not identified from the one or more inputs received from the user to a destination within the data plane of the software-defined networking system.

11. The virtualized traffic control system of claim 8, wherein, the software-defined networking system further comprises instructions, that when executed by the at least one processor, cause the software-defined networking system to, in response to receiving the response communication indicating to forward the one or more data packets identified from the one or more inputs received from the user, forwarding the one or more data packets to a destination within the data plane of the software-defined networking system.

12. The virtualized traffic control system of claim 8, wherein, the software-defined networking system further comprises instructions, that when executed by the at least one processor, cause the software-defined networking system to perform at least one of:
   determine whether a source of the one or more data packets is authorized to communicate on a software-defined industrial control system; and
   determine whether a TCP port or group of ports through which the one or more data packets were received is authorized to receive traffic in response to settings configured in real time by an operator, the settings including one or more actions chosen from firmware updates, configuration changes, a file upload, and a file download corresponding to the one or more data packets.

13. The virtualized traffic control system of claim 8, wherein, the software-defined networking system further comprises instructions, that when executed by the at least one processor, cause the software-defined networking system to deny by default any data packet of the one or more data packets unassociated with the match groups.

14. The virtualized traffic control system of claim 8, wherein analyzing the one or more data packets at a protocol level within the data plane of the software-defined networking system comprises: analyzing the one or more data packets with a deep packet inspection operating at an application layer.

15. A non-transitory computer readable medium storing instructions thereon that, when executed within a software-defined networking system by at least one processor, cause the at least one processor to perform steps comprising:
   receive one or more data packets;
   analyze the one or more data packets at a protocol level within a data plane of the software-defined networking system; and
   based on the analysis, separating protocol command messages into match groups upon which different rule sets are applied and determining whether the one or more data packets are authorized data packets associated with an authorized command utilizing a respective rule set applied to the one or more data packets associated with a respective match group for each of the one or more data packets.

16. The non-transitory computer readable medium of claim 15, further comprising instructions that, when executed within the software-defined networking system by the at least one processor, cause the at least one processor to, upon determining that the one or more data packets are authorized, forward the one or more data packets to a destination device.

17. The non-transitory computer readable medium of claim 15, wherein analyzing the one or more data packets at the protocol level comprises:
   disassembling the one or more data packets; and
   comparing data of the one or more data packets to one or more switching tables.

18. The non-transitory computer readable medium of claim 15, further comprising instructions that, when executed within the software-defined networking system by the at least one processor, cause the at least one processor to:
   upon determining that the one or more data packets are unauthorized, forward the one or more data packets to a table; and
   logging the one or more data packets as a network violation.

19. The non-transitory computer readable medium of claim 15, further comprising instructions that, when executed within the software-defined networking system by the at least one processor, cause the at least one processor to provide information related to the one or more data packets to a software-defined out-of-band monitoring and control system for display to a user.

20. The non-transitory computer readable medium of claim 19, further comprising instructions that, when executed within the software-defined networking system by the at least one processor, cause the at least one processor to, in response to receiving a response communication from the software-defined out-of-band monitoring and control system forwarding the one or more data packets to a destination device, the response based on one or more inputs received from a user at the out-of-band monitoring and control system.

* * * * *